United States Patent
Younger et al.

(10) Patent No.: US 9,823,999 B2
(45) Date of Patent: Nov. 21, 2017

(54) PROGRAM LIFECYCLE TESTING

(71) Applicant: Bank of America Corporation, Charlotte, NC (US)

(72) Inventors: Steve C. Younger, Basking Ridge, NJ (US); Harshal L. Jambusaria, Pineville, NC (US); Mark O. Carter, Virginia Beach, VA (US); Bharat Kumar Bathula, Hyderabad (IN); Abbner Uriel Torres Ramos, Monterrey (MX)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/833,547

(22) Filed: Aug. 24, 2015

(65) Prior Publication Data

US 2017/0060728 A1    Mar. 2, 2017

(51) Int. Cl.
*G06F 9/44* (2006.01)
*G06F 11/36* (2006.01)
*G06F 9/445* (2006.01)

(52) U.S. Cl.
CPC .............. *G06F 11/368* (2013.01); *G06F 8/65* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 7,475,425 B2* | 1/2009 | Bantz .................. | H04L 63/1483 714/E11.207 |
| 7,536,599 B2* | 5/2009 | Paliwal ............... | G06F 11/2247 714/15 |
| 2002/0120885 A1* | 8/2002 | Choi ........................ | G06F 8/65 714/38.1 |
| 2012/0290527 A1* | 11/2012 | Yalamanchilli ... | G06F 17/30592 707/602 |
| 2014/0052852 A1* | 2/2014 | Dufour .................. | H04L 43/10 709/224 |

\* cited by examiner

*Primary Examiner* — Qamrun Nahar
(74) *Attorney, Agent, or Firm* — Michael A. Springs

(57) ABSTRACT

In one embodiment, a system for program lifecycle testing includes receiving a request to test a program update at an interface. Using a processor, the system may then execute a validation test associated with the program update, wherein the validation test is conducted in a testing environment comprising a plurality of testing environment systems. The system may then use the processor to capture a current state of the testing environment at a start of the validation test, and confirm that the plurality of testing environment systems are operating according to the validation test. The system may then use the interface to receive testing results from the validation test and compare the testing results to previous test results from a prior program update. The system may then store the validation test results, the current state of the testing environment, and a name of the program update, in a performance database.

20 Claims, 3 Drawing Sheets

200 ⟶

| PROJECT DASHBOARD ⟵ 210 | | | | |
|---|---|---|---|---|
| | Jan | Feb | Mar | Apr |
| Initiatives | 4 | 10 | 11 | 2 |
| Applications | 18 | 91 | 48 | 30 |
| Cost | 100,000 | 300,000 | 25,000 | 50,000 |
| Resources | 15 | 145 | 76 | 34 |

220 ⟶ Initiatives
230 ⟶ Applications
240 ⟶ Cost
250 ⟶ Resources

Activity Feed ⟵ 310

320 ⟶ @LTM: @Tester1 has initiated a <u>PK Hour Test</u> on the <u>April Independent Release</u> #Iniativel
Reply
  ⟵ 322   ⟵ 324

330 ⟶ @LTM: @Tester2 has completed a <u>Duration Test</u> on the <u>April Independent Release</u> #Iniativel
Reply 340 ⟶ @TestManager: @Tester2 @Tester1 @DevTeam I have reviewed the <u>Duration Test</u> on the <u>April Independent Release</u> and I am satisfied that we have resolved the #Database memory issue
Reply

*FIG. 3*

PROGRAM LIFECYCLE TESTING

TECHNICAL FIELD

The present invention relates generally to the field of system operations and, more specifically, to program lifecycle testing.

BACKGROUND

Enterprises continuously update their applications and infrastructure to accommodate market demands and technology advances. An application update may vary in complexity and may utilize varying levels of enterprise infrastructure. Implementing an application update involves significant testing and auditing to ensure proper performance of the application when implemented. Enterprises spend significant resources planning, executing, and analyzing application updates.

SUMMARY

In accordance with the present disclosure, disadvantages and problems associated with program lifecycle testing may be reduced or eliminated.

In one embodiment, a system for program lifecycle testing includes receiving a request to test a program update at an interface. Using a processor, the system may then execute a validation test associated with the program update, wherein the validation test is conducted in a testing environment comprising a plurality of testing environment systems. The system may then use the processor to capture a current state of the testing environment at a start of the validation test, and confirm that the plurality of testing environment systems are operating according to the validation test. The system may then use the interface to receive testing results from the validation test and compare the testing results to previous test results from a prior program update. The system may then store the validation test results, the current state of the testing environment, and a name of the program update, in a performance database.

In another embodiment, a method for program lifecycle testing includes receiving a request to test a program update. Executing a validation test associated with the program update, the validation test conducted in a testing environment comprising a plurality of testing environment systems. The method may then capture a current state of the testing environment at a start of the validation test, and confirm that the plurality of testing environment systems are operating according to the validation test. The method then receives testing results from the validation test and compares the testing results from the validity test to a previous test result from a prior program update. The method may then store, in a performance database, the validation test results, the current state of the testing environment, and a name of the program update.

Certain embodiments of the disclosure may provide one or more technical advantages. One advantage of the present disclosure allows for the improved performance of the enterprise network once a program update is implemented by identifying and remediating issues during the testing of the program update. Another advantage allows for improved performance of network systems by testing a program update in a number of stress scenarios to ensure proper performance when the program update is implemented. Yet another advantage allows for the efficient testing and implementation of a program update by managing project resources, executing program tests, and remediating issues identified by the tests. One or more other technical advantages may be readily apparent to one skilled in the art from the figures, descriptions, and claims, included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a screenshot illustrating an embodiment of a project dashboard of test management program;

FIG. 3 is a screenshot illustrating an example activity feed created by the lifecycle testing module.

DETAILED DESCRIPTION OF THE DRAWINGS

Figure 1:
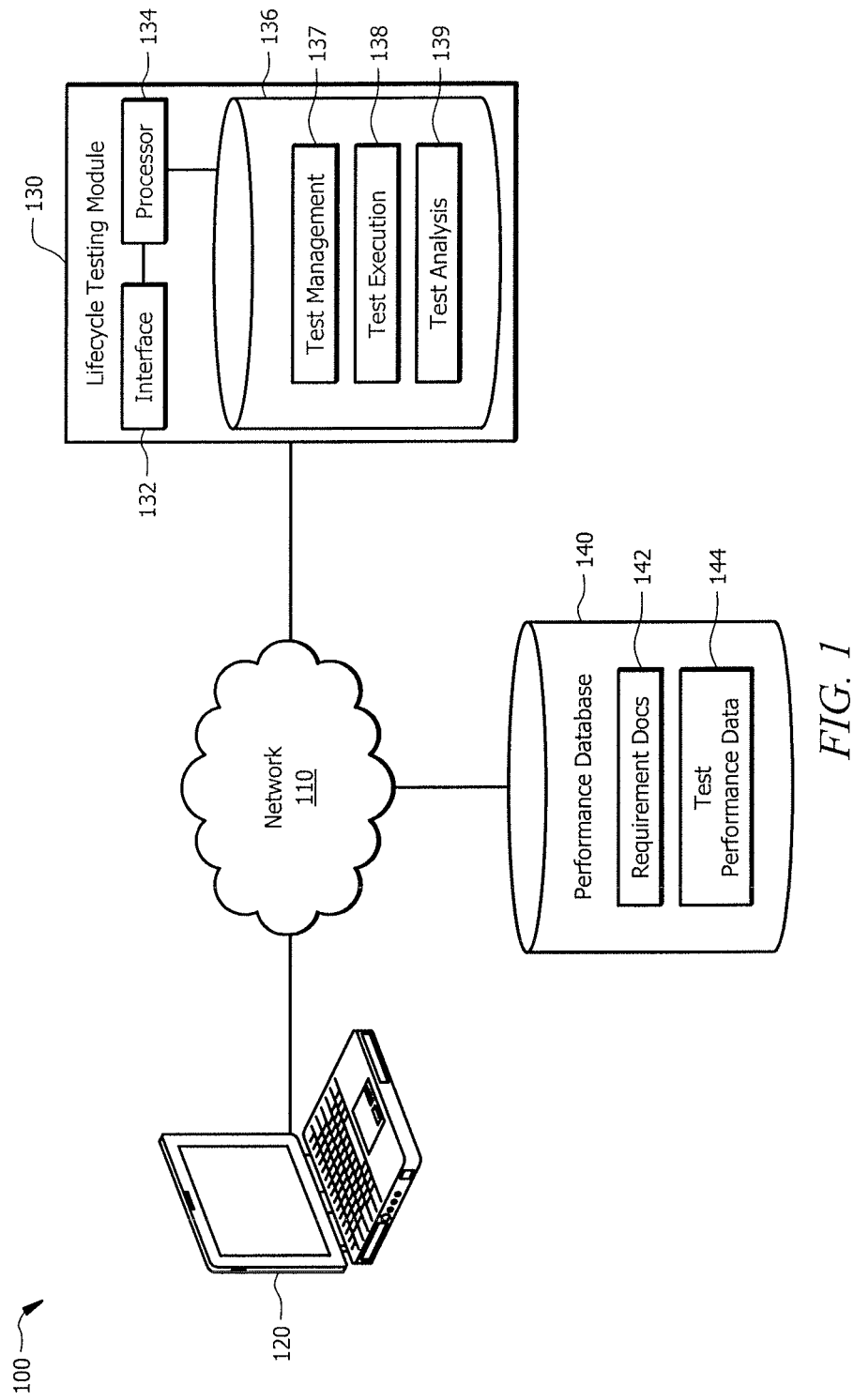
FIG. 1 is an example system for program lifecycle testing.

Embodiments of the present disclosure and its advantages are best understood by referring to FIGS. 1-4, like numerals being used for like and corresponding parts of the various drawings.

Enterprises continuously update their applications and infrastructure to accommodate market demands and technology advances. An application update may vary in complexity and may utilize varying levels of enterprise infrastructure. Implementing an application update involves significant testing and auditing to ensure proper performance of the application when it is implemented. Enterprises spend significant resources planning, executing, and analyzing application updates.

In regulated operating environments, compliance organizations and government agencies often audit the software engineering, deployment and operational processes that deliver critical lines of business services to the public or other regulated agencies. Auditors may ask for proof that certain combinations of hardware, software, and infrastructure changes were tested before implementation. It is therefore advantageous to provide a system and method that provides for the planning, execution, and analysis of a program lifecycle. For example, an enterprise may decide to update an application running on their website. Before updating the website with the new program, the enterprise may first ensure that the program update will operate properly when implemented. The enterprise may test the program update in a number of scenarios, such as how the program operates during peak usage times. Depending on the complexity or frequency of the program update, the enterprise may use multiple teams and employees to design, code, test, and implement the program update.

Furthermore, the update may utilize a number of systems in the enterprise's network. The program update may call one or more servers, databases, and mainframes during the program operation. To ensure proper operation of these systems, the enterprise may test the program update and capture data related to each of the utilized systems. In certain embodiments, the enterprise may compare the performance of the systems to historical data collected during previous program updates. In some embodiments, the enterprise may institute internal performance requirements that must be met before the update may be implemented.

During the testing of the program update, the enterprise may collect and socialize the testing results. For example, the enterprise may create an activity feed related to the development, testing, and implementation of the program update. The activity feed may allow a number of users involved in the program update to stay informed with the progress of the update. For instance, a testing group may run a number of tests on the program update. If the update fails one of the tests, the activity feed may notify the application development team and the network infrastructure team about the potential issues. In another embodiment, the activity feed may send out alerts when milestones are reached. In this manner, the enterprise may create an efficient and advantageous system and method for program lifecycle testing.

FIG. 1 is an example system 100 for program lifecycle testing. System 100 includes network 110 that facilitates communication between workstation 120, lifecycle testing module 130, and performance database 140. Elements of system 100 may occur within an enterprise. An enterprise may be an individual, business, company, or other organization. An example of an enterprise may include a clothing store, an online sales company, or a financial institution. An enterprise may include one or more lines of business, subsidiaries, or parent organizations.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Workstation 120 enables one or more users to monitor, administer, or otherwise interact with lifecycle testing module 130 and performance database 140. Workstation 120 may include one or more laptops, personal computers, monitors, display devices, handheld devices, smartphones, servers, user input devices, or other suitable components for enabling user input. Workstation 120 may itself include lifecycle testing module 130 and performance database 140. Workstation 120 may be a part of an enterprise or could remotely access an enterprise.

For example, workstation 120 may communicate a program update request to lifecycle testing module 130. The program update request may include the software to be tested, testing requirements, specific testing environments, a list of the systems invoked by the software, and the names of the developers who created the software.

In certain embodiments, workstation 120 may access test management program 137 to identify employees and vendors that are involved in certain program updates. For example, the enterprise may hire a vendor to design a program for the enterprise's website. The enterprise may first test the program on the enterprise's system to ensure that it works properly. If the enterprise uses multiple vendors, workstation 120 may access historical data for each vendor's program in lifecycle testing module 130 and determine how each vendor's program performed. As another example, workstation 120 may access test management program 137 to determine which application developers created the application being tested.

Workstation 120 may be used to add or alter tests in test execution program 138 that are run on program updates. Workstation 120 may also access test analysis program 139 to see how program updates performed during certain tests. In certain embodiments, workstation 120 may send messages or notifications to application developers and testers working on a program update using an activity feed associated with a specific program.

Workstation 120 may access performance database 140 to retrieve prior test results. For example, a program may experience an error during operation. The enterprise may determine whether the error was tested for prior to being implemented. Workstation 120 may access test performance data 144 and search for all the tests run on that version of the program. In this manner, workstation 120 may identify whether a bug in the program update was overlooked or whether a new test should be designed for future program updates. If the error was never tested for prior to implementation, workstations 120 may create a new test to evaluate subsequent program updates to catch the error.

In some embodiments, workstation 120 may facilitate the socialization of testing results from lifecycle testing module 130. A user of workstation 120 may send out a message of an activity feed created by lifecycle testing module 130 to socialize the testing results of a program update or check the status of a milestone associated with a testing project. Workstation 120 may attach relevant documents to the messages sent over the activity feed such as a requirements document for the performance requirements of a specific application being updated.

Lifecycle testing module 130 represents any suitable components that facilitate the inception, execution, analysis, and socialization of program testing. Lifecycle testing module 130 may include a network server, remote server, mainframe, host computer, workstation, web server, personal computer, file server, or any other suitable device operable to communicate with other devices and process data. In some embodiments, lifecycle testing module 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of lifecycle testing module 130 may be performed by any suitable combination of one or more servers or other components at one or more locations. In the embodiment where the modules are servers, the servers may be public or private servers, and each server may be a virtual or physical server. The server may include one or more servers at the same or at remote locations. Lifecycle testing module 130 may also include any suitable component that functions as a server. In some embodiments, workstation 120 and performance database 140 may be integrated with lifecycle testing module 130 or they may operate as part of the same device or devices.

In the illustrated embodiment, lifecycle testing module 130 includes an interface 132, a processor 134, and a memory 136, which comprises a test management program 137, a test execution program 138, and a test analysis program 139.

Interface 132 represents any suitable device operable to receive information from network 110, transmit information through network 110, perform suitable processing of the information, communicate to other devices, or any combination thereof. For example, interface 132 may receive program update requests from workstation 120, establish an activity feed to disseminate information to employees and vendors associated with a program update, and access performance database 140 to retrieve and store testing data associated with requirements documents 142 and test performance database 144. Interface 132 represents any port or connection, real or virtual, including any suitable hardware and/or software, including protocol conversion and data processing capabilities, to communicate through a LAN, WAN, or other communication system that allows lifecycle testing module 130 to exchange information with network 110, workstation 120, performance database 140, or any other components of system 100.

Processor 134 communicatively couples interface 132 and memory 136 and controls the operation of lifecycle testing module 130. Processor 134 includes any hardware and software that operates to control and process information. Processor 134 may execute computer-executable program instructions stored in memory 136. Processor 134 may include, but is not limited to, a microprocessor, an application specific integrated circuit (ASIC), and or state machines.

Memory 136 stores, either permanently or temporarily, data, operational software, other information for processor 134, other components of lifecycle testing module 130, or other components of system 100. Memory 136 includes any one or a combination of volatile or non-volatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices.

Memory 136 may store information in one or more databases, file systems, tree structures, any other suitable storage system, or any combination thereof. Furthermore, different information stored in memory 136 may use any of these storage systems. Moreover, any information stored in memory 136 may be encrypted or unencrypted, compressed or uncompressed, and static or editable. Although illustrated as including particular modules, memory 136 may include any suitable information for use in the operation of lifecycle testing module 130.

In the illustrated embodiment, memory 136 includes test management program 137, test execution program 138, and test analysis program 139.

Processor 134 may implement test management program 137 to facilitate the management and organization of a program update. For example, workstation 120 may communicate a program update request to lifecycle testing module 130. After receiving the program update request, test management program 137 may create a new project file for the program update. Test management program 137 may name the program update, for instance with a release number. In some embodiments, test management program 137 may recognize the program update and appropriately name the release number as the next version number (e.g., if the current program is version 3.1.6, test management program 137 may name the program update version 3.1.7). In some embodiments, the program request is a routine program update and the release number may refer to the date or frequency of the update (e.g., update_month).

Test management program 137 may also designate which lines of business of the enterprise the program update affects. This may allow lifecycle testing module 130 to send updates to the relevant lines of business letting the appropriate managers know when certain updates will be installed and updated. Similarly, test management program 137 may identify testing employees and application developers who are associated with the program update. The application developers may be the developers who designed and coded the update, whereas the testing employees may be the employees responsible for performing the validation or performance tests on the program updates.

In some embodiments, test management program 137 assigns one or more testing personnel to the program update. For example, test management program 137 may identify a number of testing employees who are responsible for testing a program update. Based on a number of factors, such as schedule availability, familiarity with the required tests to be applied to a program update, and experience, test management program may assign one or more testing employees to perform the tests on the program update.

In some embodiments, the program update will be sent from a vendor. Test management program 137 may link the program update with the vendor responsible for providing the update and send out alerts when the alert should be completed.

Processor 134 may also utilize test management program 137 to setup the anticipated work hours required to complete testing and implement a program update. By identifying the responsible testing employees and the anticipated work hours each employee should spend on testing, lifecycle testing module 130 may predict the anticipated costs associated with testing each program update, how long the testing actually took, and the final costs associated with running the tests. In some embodiments, test management program 137 may notify a manager or a project team leader if a testing employee has modified the scope of the program update request resulting in a deviation from an expected budget. This may include the addition of unscheduled tests that affect the testing schedule and anticipated work hours for a program update. Accordingly, test management program 137 can identify which program updates are the most costly to test, which testing employees are the most efficient, and which application developers produce code with minimal bugs.

In certain embodiments, test management program 137 creates milestones for the testing of the program update. For example, test management program 137 may produce target dates for the completion of certain tests, goals for performance criteria (i.e., system performance metrics and program operating metrics), and a final implementation date.

Depending on the program request, test management program 137 may identify one or more requirements documents 142 from performance database 140. For example, if a program update is making changes to the login routine of the enterprise's website, the enterprise may have internal security requirements that the system must meet before the update can be implemented. Requirements document 142 may specify certain security tests that the system must pass prior to implementation.

Processor 134 may use test execution program 138 to setup, conduct, and monitor the tests performed on a new program or a program update. Test execution program 138 may perform one or more validation tests to ensure the proper functionality of a program update on the enterprise's system. For example, test execution program 138 may perform a network saturation test during operation of the program update. The network saturation test may allow lifecycle testing module 130 to check the bandwidth limits of the network running the program. This test may allow the enterprise to understand if the program is transferring too much data through the network or whether the enterprise needs to procure more bandwidth.

As another example, test execution program 138 may run a peak-hour test. This test may simulate how the application performs during peak usage. For example, a clothing store may recognize that most customers shop online between 7:00 p.m. and 8:00 p.m. at night. The clothing store may test updates to the store's website during conditions similar to the traffic the website sees from 7:00 p.m. to 8:00 p.m. Testing execution program 138 may also conduct a reliability (i.e., endurance) test to simulate the operation of the program update under realistic environment conditions. The foregoing are merely illustrative examples and are not limiting.

Test execution program 138 may run any number of tests on a program. The tests may involve one or more dynamic tests involving specific test cases developed by the enterprise, or the tests may be static using compilers. These tests may lead to the validation and verification of a program update. In certain embodiments, testing may occur at various stages in the life of the program update. Test execution program 138 may test specific subsections of a program update. In some embodiments, an enterprise may incorporate new network components. To ensure seamless integration of program updates with the new components, test execution program 138 may conduct an integration test, and incrementally add new components from the network throughout testing. In some scenarios, a program update may make significant overhauls to a previous version of the program. Test execution program 138 may run a regression test on the updated code and check the results against previous testing results to see if previously removed bugs were reintroduced to the program. In this manner, test execution program 138 can measure the delay, throughput, and loss present in the enterprise's network while operating a program.

During the testing of a program update, processor 134 may utilize test execution program 138 to capture the current state of the testing environment at the start of the test. For example, processor 134 may determine the network load between the systems in the testing environment to ensure that the system is balanced. In some embodiments, processor 134 may determine whether the domain name system (DNS) of the testing environment systems are correctly mapped. Confirming that each device in a network properly maps the device's DNS name to an associated IP address ensures that communications between network devices occurs without error. For example, a program update may affect one or more web servers that facilitate communications with browsers and one or more application servers. Test execution program 138 may check that the domain names for each of the servers corresponds to an updated IP address so that a network communication error does not occur during the testing of the program update. As another example, test execution program 138 may check for various known anti-patterns in the testing environment (i.e., patterns that are potentially inefficient or unreliable), such as excessive logging, improper runtime configurations, or mismatched content assets with system software. This may allow testers and application developers to focus on errors introduced by the program update instead of preexisting errors within the network.

As an illustrative example, test execution program 138 may run a test on a program update that affects the login program running on the enterprise's website. The validity test for the program update may implement a peak-hours test to simulate a high-traffic load on the login system. Using test execution program 138, processor 134 may confirm that the web servers are operating under the appropriate loads for a peak-hours test (e.g., each webserver is processing a certain number of requests per second based on what the enterprise considers high traffic). For example, test execution program 138 may determine that the testing program is not simulating sufficient traffic on the web servers when testing the program update. Test execution program 138 may adjust the webserver traffic by increasing the transactions per second to reflect the proper traffic experienced during peak hours. In some embodiments, test execution program 138 may determine that the traffic across the webservers is unbalanced and may adjust the traffic using one or more load balancing techniques.

In this manner, lifecycle testing module 130 can understand what the testing conditions were during the testing of the program update. Test execution program 138 may ensure that each of the systems invoked by the program being updated is operating correctly. This allows lifecycle testing module 130 to limit the sources of error when performing a test.

In certain embodiments, lifecycle testing module 130 may determine that certain testing environment systems are not operating properly. Processor 134 may act as a load balancer and change the system settings to adjust the network system operating improperly. For example, test execution program 138 may identify that a server in a server cluster operating in the testing system is unbalanced. Processor 134 may avoid network congestion by rerouting traffic through different nodes in the enterprise's system. As another example, a program update may affect an enterprise's email system. Lifecycle testing module 130 may ensure that the network sessions created by email are efficiently distributed across network resources to maximize the bandwidth available to the enterprise.

Processor 134 may utilize any technique or algorithm required to ensure proper flow of traffic and proper distribution of server and database requests. Lifecycle testing manager 130 may also determine whether the enterprise has sufficient network resources to maintain operations should a connection or server fail.

Once test execution program 138 finishes a test and receives the results of the test, processor 134 may store the results in test performance database 144. In some embodiments, processor 134 may also store the state of the testing environment and the name (revision number) of the program update. In an example embodiment, data such as the release number of the program update, the testing environment systems utilized during the testing, the line of business affected by the program update, and any associated requirements documents are tagged to the testing results as metadata. In this manner, a record may establish all the tests and environments a program was tested under prior to implementation.

Processor 134 may use test analysis program 139 to analyze the test results, compare the test results to historic data, and disseminate the results to relevant testing members and application developers. For example, in certain embodiments, processor 134 may compare the test results of a program update to test results run on previous versions of the program. For example, if a program update is version 5.1.7 of a program, the peak-hour test results for the program update may be compared to peak-hour test results for the currently operating program version 5.1.6. In some embodiments, the enterprise may have a standardized benchmark for how certain applications must perform.

In certain embodiments, the results of the program update test will be sent to certain members of the enterprise based on their role in the program update. For example, if a bug in the program code is detected, an application developer may get a message stating the results of the test and the portion of the code that failed. Similarly, if a system in the network became unbalanced or failed during the update test, a member of the systems team may be notified. As another example, if the program update test underperformed during the validity test, the application developer may get a message indicating the performance results and how the program update failed.

Lifecycle testing module 130 may generate the message using any number of communication methods, such as email, SMS messaging, an RSS feed, or any other suitable communications methods. Users involved with the program update may subscribe to updates generated by test analysis program 139. In this manner, lifecycle testing module 130 may notify the proper employees of the enterprise to efficiently resolve issues when troubleshooting a program update.

When workstation 120 sends a program update request to lifecycle testing module 130, test analysis program 139 may create an activity feed that facilitates communication between members involved in the program update. Users may log into the feed to discuss issues with the updates, the specific tests that should be applied to the update, and potential solutions to overcome bugs in the software. In some embodiments, users may provide hyperlinks to relevant diagnostic data such as memory and thread dumps, and relevant reports or incident numbers from a vendor's incident tracking system. Accordingly, test analysis program 139 may provide a communication channel that enhances the testing and implementation of a program update.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the invention. For example, test management program 137 may identify the resources and estimate the cost for a specific program update test upon receiving a program update request. Test management program 137 may also generate enterprise wide reports detailing the number of program updates being tested and implemented and the average and total costs associated with those program implementations. Any suitable logic may perform the functions of system 100 and the components within system 100.

FIG. 2 is a screenshot 200 illustrating an embodiment of a project dashboard 210 created by test management program 137. In certain embodiments, test management program 137 may produce project dashboard 210 so program testers, application developers, and enterprise managers may understand the number of applications and projects being implemented for a given time period.

In the illustrated embodiment, project dashboard 210 comprises a number of rows including initiatives 220, applications 230, cost 240, and resources 250. Project dashboard 210 may provide information for each row for certain time periods. For example in the illustrated embodiment, project dashboard 210 includes columns for the months of January, February, March, and April. Additionally or alternatively, project dashboard may include time periods such as specific quarters, years, or a specific range of dates.

Initiatives 220 details the number of projects affecting the enterprise. An initiative may be to update the login system customers use when logging into the enterprise's website. This initiative may affect several applications and resources. A change to an enterprise's login system may require updates to four applications that handle various systems related to logging in to the website. Applications 230 may keep track of how many applications are being updated in response to the initiatives being implemented. Cost 240 may provide an estimate of how much the testing and implementation of the various initiatives 220 is likely to cost. Cost 240 may take into account the worker hours needed to code and test applications 230. In some embodiments, cost 240 may represent the actual amount of money spent for a given time period. Resources 250 indicate how many system components were utilized to test and implement applications 230. Certain applications 230 may only affect one or two resources 250 while other applications 230 may affect a wide number of resources. For example, an application affecting the login system for an enterprise may require testing the application multiple servers and databases, whereas an application that updates the way user names are stored may only affect a single database and a single server.

In the illustrated embodiment, project dashboard 210 shows that for the month of January, there were 4 initiatives 220, 18 applications 230, utilizing 15 resources 250, at a cost 240 of $100,000. In March, there were 11 initiatives 220, requiring updates to 48 applications 230, using 76 resources 250, at a cost of $25,000.

Modifications, additions, or omissions may be made to system project dashboard 210 without departing from the scope of the disclosure. For example, project dashboard 210 may allow a user to click on any one of the rows to obtain more detailed information. For example, a user may click on applications 230 to receive a list of each of the program updates that were tested that month. Similarly, a user may click on initiatives 220 to see the different projects being implemented. Any suitable logic may perform the functions of project dashboard.

FIG. 3 is a screenshot 300 illustrating an example activity feed 310 created by lifecycle testing module 130. Activity feed 310 may be generated by lifecycle testing module 130 in response to receiving a program update request from workstation 120. Activity feed 310 may be subscribed to by any number of application developers, managers, and testers. Activity feed 310 may take a number of forms such as an RSS feed, a community board, or a comment section. The messages may be automatically generated by lifecycle testing module 130 or may be created by the subscribers to activity feed 310.

In the illustrated embodiment, activity feed 310 comprises a number of messages sent out for an example April Independent Release program update. First message 320 was automatically generated by lifecycle testing module 130 as indicated by "@LTM" (Lifecycle Testing Module). The message indicated that Tester1, indicated by "@tester1," initiated a peak hours test on the April Independent Release program update. Furthermore, the message indicates that the April Independent Release is part of a first initiative, indicated by the "#Initiative1." In this manner, subscribers to activity feed 310 may be informed that the peak hours test was performed. In some embodiments, underlined "PK Hour Test" 322 may be a hyperlink that allows a subscriber to access the test results for the peak hour test. Similarly, underlined "April Independent Release" 324 may be a hyperlink that allows a subscriber to access information related to the April Independent Release, such as the source code or employees working on the release. The "#Initiative1" may be used to quickly and efficiently organize all messages related to the first initiative. All messages including the Initiative1 hashtag may be searchable by clicking on the hashtag.

Similar to first message 320, second message 330 is automatically generated by lifecycle testing manager 130 as indicated by the "@LTM." Second message 330 indicates that Tester 2 completed a endurance test on the April Independent Release and included the first initiative hashtag. In this manner, subscribers to activity feed 310 may be notified that the program update has completed the endurance test.

Third message 340 is sent from a manager of the testing as indicated by the "@TestManager" moniker. Third message 340 may be specifically sent by the test manager to the first program update tester, the second program update tester, and the application development team by including the monikers: @tester1, @tester2, and @DevTeam. The third message 340 may include information that the test manager has received the endurance test results for the April Independent release, and the memory issues related to the database were remediated. Subscribers may be able to look into what issues were remediated by clicking on the #Database moniker. In this manner, a test manager may be able to update the personnel involved with the development and testing of an application in a quick and efficient manner. Furthermore, anyone from the application development team or the first and second testers may be able to click the "reply" button to respond to the testing managers message.

Modifications, additions, or omissions may be made to activity feed 310 without departing from the scope of the disclosure. For example, accessing peak test results 322 or accessing April Independent Release 324 may be limited to certain members of the testing or development team. Furthermore, in certain embodiments, lifecycle testing module may only send the messages to the subscribes affected by the message as indicated by the @ symbol. Accordingly, the activity feed may only provide relevant information to subscribers. Any suitable logic may perform the functions of project dashboard.

Figure 4:
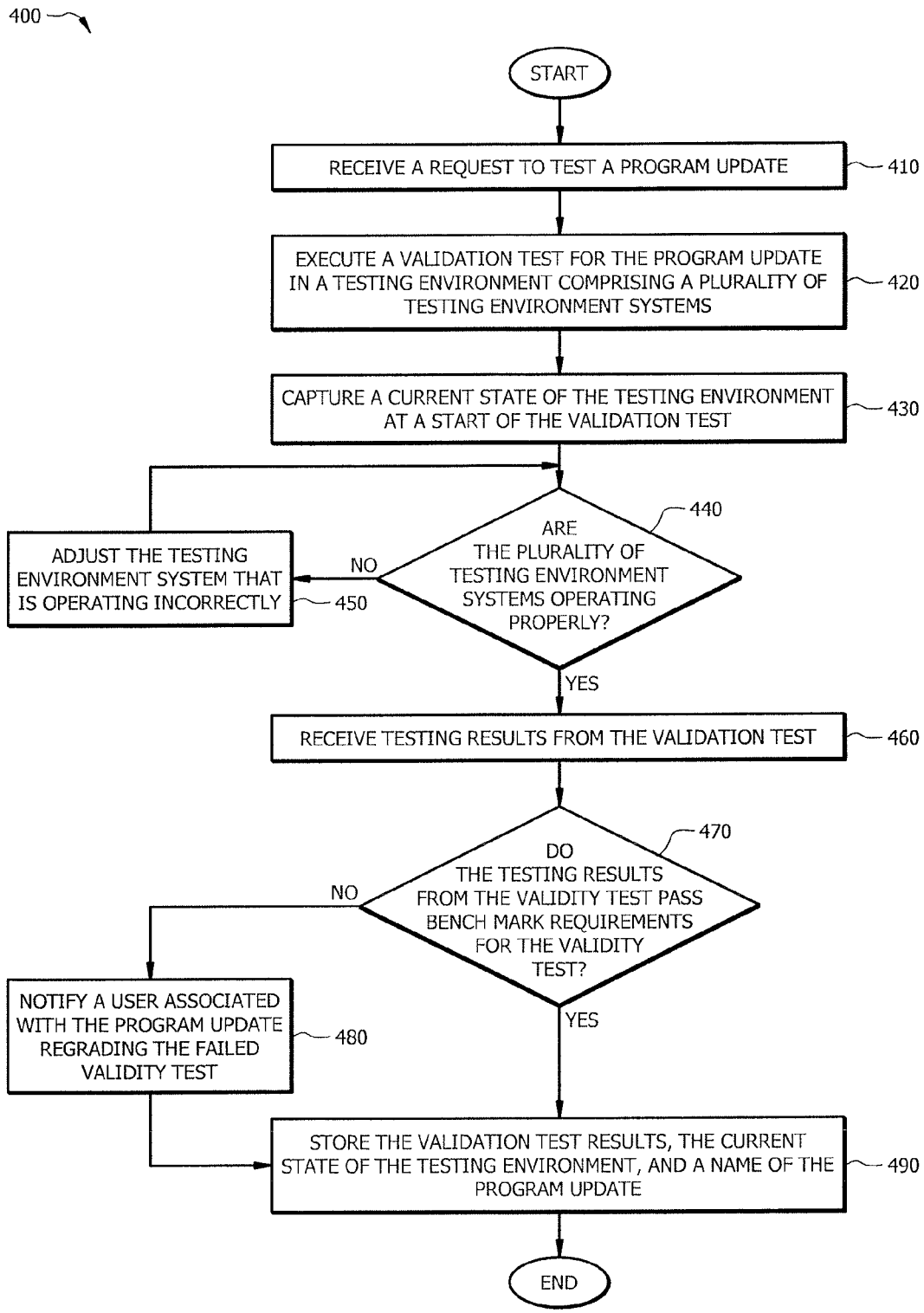
FIG. 4 is a flowchart of a method for program lifecycle testing.

FIG. 4 is a flowchart of a method 400 for applying lifecycle program testing to a program update. At step 410, lifecycle testing module 130 receives a request to test a program update. The program update request may include the software to be tested, testing requirements, specific testing environments, a list of the systems invoked by the application running the software, and the names of the developers who created the software.

At step 420, lifecycle testing module 130 executes a validation test for the program update in a testing environment comprising a plurality of testing environment systems. The type of validation test applied may be dependent on the systems affected by the program update. Validation tests may include a endurance test, a network saturation test, and a peak hours test.

At step 430, lifecycle testing module 130 captures a current state of the testing environment at the start of the validation test. Lifecycle testing module 130 may capture this information to ensure that problems with the program update are related to the code or the effects of the code on the system and not due to the environment the code was tested on. In certain embodiments, lifecycle testing module 130 captures the network load between the plurality of testing environment systems involved in the validation test to ensure the systems are balanced. Lifecycle testing module 130 may also determine that a plurality of Domain Name System entries of the testing environment systems are properly mapped.

At step 440, lifecycle testing module 130 determines whether the testing environment systems are operating properly. If the systems are operating properly, then the method proceeds to step 460. If one or more of the systems are not operating properly the sequence proceeds to step 450.

At step 450, lifecycle testing module 130 adjusts the one or more testing systems not operating properly and returns to step 440 to re-determine whether the testing environment is operating properly. For example, lifecycle testing module 130 may identify that a server in a server cluster operating in the testing system is unbalanced. Processor 134 adjusts the network congestion by rerouting traffic through different nodes in the enterprise's system.

At step 460, lifecycle testing module 130 receives the results from the validation test and at step 470, lifecycle testing module 130 compares the results from the validation test to bench mark requirements for the validation test. If the test results pass the benchmark requirements, then the sequence proceeds to step 490, if the results do not pass the bench mark requirements then the sequence proceeds to step 480.

At step 480, lifecycle testing module 130 notifies a user associated with the program update that the test results did not pass the benchmark. This notification may be done over an activity feed subscribed to by employees associated with the program update.

At step 490, lifecycle testing module 130 may store the validation test results, the current state of the testing environment, and a name of the program update in test performance database 144. In this manner, a record of all the tests and results for a given program update may be saved and referred to if an issue arises after the program update is implemented. This may allow the enterprise to implement an auditing program that improves the quality and performance of the enterprise's applications and systems.

Various embodiments may perform some, all, or none of the steps described above. For example, lifecycle testing module 130 may tag the testing results with different metadata including the line of business affected by the program update, and any requirements documents associated with the program update. While discussed as lifecycle testing module 130 performing these steps, any suitable component of system 100 may perform one or more steps of the method.

Certain embodiments of the disclosure may provide one or more technical advantages. One advantage of the present disclosure allows for the improved performance of the enterprise network once a program update is implemented by identifying and remediating issues during the testing of the program update. Another advantage allows for improved performance of network systems by testing a program update in a number of stress scenarios to ensure proper performance when the program update is implemented. Yet another advantage allows for the efficient testing and implementation of a program update by managing project resources, executing program tests, and remediating issues identified by the tests. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system for a program lifecycle testing, comprising:
an interface operable to:
  receive a request to test a program update;
a processor communicatively coupled to the interface, the processor operable to:
  execute a validation test associated with the program update, the validation test conducted in a testing environment comprising a plurality of testing environment systems, at least one of the testing environment systems comprising a network, wherein the testing environment facilitates determining whether the program update comprises a software coding error;
  capture a current state of the testing environment at a start of the validation test;
  confirm that the plurality of testing environment systems are operating according to the validation test, wherein the validation test is a selected one from the group consisting of:
    a network saturation test, comprising:
      performing the program update within the network; and
      determining bandwidth limits of the network while performing the program update;
    a peak-hour network test, comprising:
      determining a peak time for the network;
      determining traffic conditions of the network during the peak time; and
      testing the program update with the traffic conditions; and
    a network endurance test, comprising:
      simulating the operation of the program update using network environment conditions;
the interface is further operable to:
  receive testing results from the validation test; and
the processor is further operable to:
  compare, using the processor, the testing results from the validity test to a previous test result from a prior program update; and
  store, in a perfonnance database communicatively coupled to the processor, the validation test results, the current state of the testing environment, and a name of the program update.

2. The system of claim 1, wherein receive a request for a program update further comprises:
establish an activity feed associated with the program update;
assign one or more testing personnel to the program update; and
create one or more milestones associated with the program update.

3. The system of claim 2, further comprising:
distribute the activity feed to one or more application developers associated with the program update; and
receive through the activity feed, a test defect from the one or more users, identifying one or more defects in the validation test results.

4. The system of claim 1, wherein capture a current state of a testing environment comprises:
determine that a network load between the plurality of testing environment systems involved in the validation test is balanced; and
determine that each of a plurality of Domain Name System (DNS) entries of the testing environment systems involved in the validation test are correctly mapped to an Internet Protocol (IP) address of the system.

5. The system of claim 1, wherein one or more of the testing personnel receive an update via at least one of email and SMS messaging, the update comprising the testing results.

6. The system of claim 1, wherein confirm that a plurality of testing environment systems are operating properly further comprises:
identify at least one of the plurality of testing environment systems that is operating incorrectly; and
adjust the at least one testing environment system operating incorrectly, wherein adjusting the testing environment comprises rerouting network traffic.

7. The system of claim 1, further comprising:
tag the validity test results with a plurality of metadata comprising:
  a release number of the program update;
  the testing environment systems utilized during the validity test;
  a line of business affected by the program update; and
  a requirements document associated with the program update.

8. The system of claim 1, further comprising:
determine that one or more parameters of the testing results from the validity test underperformed the previous test results from the prior program update;
communicate a message to an application developer associated with the program update indicating that the program update underperfothied the validity test.

9. A method for program lifecycle testing, comprising:
receiving a request to test a program update;
executing, using a processor, a validation test associated with the program update, the validation test conducted in a testing environment comprising a plurality of testing environment systems, at least one of the testing environment systems comprising a network, wherein the testing environment facilitates determining whether the program update comprises a software coding error;
capturing, using the processor, a current state of the testing environment at a start of the validation test;
confirming, using the processor, that the plurality of testing environment systems are operating according to the validation test, wherein the validation test is a selected one from the group consisting of:
  a network saturation test, comprising:
    performing the program update within the network; and
    determining bandwidth limits of the network while performing the program update;
  a peak-hour network test, comprising:
    determining a peak time for the network;
    determining traffic conditions of the network during the peak time; and
    testing the program update with the traffic conditions; and
  a network endurance test, comprising:
    simulating the operation of the program update using network environment conditions;
receiving testing results from the validation test;
comparing, using the processor, the testing results from the validity test to a previous test result from a prior program update; and
storing, in a performance database, the validation test results, the current state of the testing environment, and a name of the program update.

10. The method of claim 9, wherein receiving a request for a program update further comprises:
   establishing an activity feed associated with the program update;
   assigning one or more testing personnel to the program update; and
   creating one or more milestones associated with the program update.

11. The method of claim 10, further comprising:
   distributing the activity feed to one or more application developers associated with the program update; and
   receiving, through the activity feed, a test defect from the one or more users, wherein the test defect identifies one or more defects in the validation test results.

12. The method of claim 9, wherein capturing a current state of a testing environment comprises:
   determining that a network load between the plurality of testing environment systems involved in the validation test is balanced; and
   determining that each of a plurality of Domain Name System (DNS) entries of the testing environment systems involved in the validation test are correctly mapped to an Internet Protocol (IP) address of the system.

13. The method of claim 9, wherein one or more of the testing personnel receive an update via at least one of email and SMS messaging, the update comprising the testing results.

14. The method of claim 9, wherein confirming that a plurality of testing environment systems are operating properly further comprises:
   identifying at least one of the plurality of testing environment systems that is operating incorrectly; and
   adjusting the at least one testing environment system operating incorrectly, wherein adjusting the testing environment comprises rerouting network traffic.

15. The method of claim 9, further comprising:
   tagging the validity test results with a plurality of metadata comprising:
      a release number of the program update;
      the testing environment systems utilized during the validity test;
      a line of business affected by the program update; and
      a requirements document associated with the program update.

16. The method of claim 9, further comprising:
   comparing the testing results from the validity test to one or more benchmarks from a service level agreement (SLA); and
   determining that the testing results fail to meet at least one of the one or more benchmarks from the SLA and communicate a message indicating that the program update is unacceptable.

17. A non-transitory computer readable storage medium comprising logic, the logic operable, when executed by a processor, to:
   receive a request for a program update and in response to receiving a request for a program update, assign one or more testing personnel to test the program update and create one or more milestones associated with the program update;
   execute a validation test associated with the program update, the validation test conducted in a testing environment comprising a plurality of testing environment systems, at least one of the testing environment systems comprising a network, wherein the testing environment facilitates determining whether the program update comprises a software coding error;
   capture a current state of the testing environment at a start of the validation test;
   confirm that the plurality of testing environment systems are operating according to the validation test, wherein the validation test is a selected one from the group consisting of:
      a network saturation test, comprising:
         performing the program update within the network; and
         determining bandwidth limits of the network while performing the program update;
      a peak-hour network test, comprising:
         determining a peak time for the network;
         determining traffic conditions of the network during the peak time; and
         testing the program update with the traffic conditions; and
      a network endurance test, comprising:
         simulating the operation of the program update using network environment conditions;
   receive testing results from the validation test;
   compare the testing results from the validity test to a previous test result from a prior program update; and
   store, in a performance database, the validation test results, the current state of the testing environment, and a name of the program update.

18. The non-transitory medium of claim 17, wherein capture a current state of a testing environment comprises:
   determine that a network load between the plurality of testing environment systems involved in the validation test is balanced; and
   determine that each of a plurality of Domain Name System (DNS) entries of the testing environment systems involved in the validation test are correctly mapped to an Internet Protocol (IP) address of the system.

19. The non-transitory medium of claim 17, wherein one or more of the testing personnel receive an update via at least one of email and SMS messaging, the update comprising the testing results.

20. The non-transitory medium of claim 17, wherein confirm that a plurality of testing environment systems are operating properly further comprises:
   identifying at least one of the plurality of testing environment systems that is operating incorrectly; and
   adjusting the at least one testing environment system operating incorrectly, wherein adjusting the testing environment comprises rerouting network traffic.

* * * * *